United States Patent [19]

Smith

[11] Patent Number: 5,025,043
[45] Date of Patent: Jun. 18, 1991

[54] POLYMERIZED FATTY ACID POLYAMIDE RESIN DISPERSIONS AND METHOD FOR THE MANUFACTURE THEREOF

[75] Inventor: George A. Smith, Langhorne, Pa.

[73] Assignee: Union Camp Corporation, Wayne, N.J.

[21] Appl. No.: 464,572

[22] Filed: Jan. 16, 1990

Related U.S. Application Data

[63] Continuation of Ser. No. 151,773, Feb. 3, 1988, abandoned.

[51] Int. Cl.$^5$ ............................ C08J 3/03; C08K 5/09; C08L 77/08
[52] U.S. Cl. ...................................... 523/326; 524/99; 524/375; 524/394; 524/396; 524/514; 524/607; 524/608
[58] Field of Search ................. 523/326; 524/607, 608, 524/394, 396

[56] References Cited

U.S. PATENT DOCUMENTS

| | | | |
|---|---|---|---|
| 3,844,991 | 10/1974 | Ferraro | 524/608 |
| 4,123,403 | 10/1978 | Warner | 524/608 |
| 4,886,844 | 12/1989 | Hayes | 524/607 |

FOREIGN PATENT DOCUMENTS

| | | | |
|---|---|---|---|
| 520332 | 1/1956 | Canada | 524/608 |
| 557649 | 5/1958 | Canada | 524/608 |
| 557651 | 5/1958 | Canada | 524/608 |

*Primary Examiner*—C. Warren Ivy
*Attorney, Agent, or Firm*—Edward J. Sites

[57] ABSTRACT

A method is provided for the preparation of stable aqueous dispersions of non-solvated, un-neutralized, low amine, low acid number polymerized fatty acid polyamide resins. In the preferred method of this invention, a polymerized fatty acid polyamide resin which has been prepared so as to have a low acid and low amine number is liquified by heating the polyamide resin to a temperature where it is at or above its melting point. The liquified polymerized fatty acid polyamide resin is then blended with a predetermined amount of water which is heated to a temperature such that the resulting blend will have a temperature above the melting point of the polyamide resin. A surfactant which will promote the emulsification of the polyamide resin and water is included in the mixture. The resulting mixture is then subjected to sufficient comminuting forces to form an emulsion in which droplets of the polyamide resin have a volume average size distribution of about 20 microns or less in diameter and preferably 5 microns or less. The resulting emulsion is then cooled to a temperature below the melting point of the polyamide resin causing the emulsified droplets of the polyamide resin to solidify as finely divided particles which are dispersed uniformly through the aqueous phase. The resulting stable aqueous dispersions of the polymerized fatty acid polyamide resin which are obtained are especially useful for hot melted adhesive applications, and when utilized in coatings, inks, and the like.

14 Claims, No Drawings

POLYMERIZED FATTY ACID POLYAMIDE RESIN DISPERSIONS AND METHOD FOR THE MANUFACTURE THEREOF

This is a continuation of application Ser. No. 151,773, filed Feb. 3, 1988, now abandoned.

This invention relates to aqueous dispersions of polyamide resins and more particularly is concerned with stable aqueous dispersions of non-solvated, un-neutralized, low acid, low amine number, polymerized fatty acid polyamide resins and the method for the manufacture thereof.

BACKGROUND OF THE INVENTION

Polyamide resins are a well known class of resins as is the general method for their preparation. Polyamide resins are typically manufactured by reacting a di- or polyfunctional amine with a di- or polyfunctional acid. Most of the diacids and diamines which are commonly employed to prepare polyamide resins give polyamide resins which are essentially linear. The properties of the polyamide resins will vary considerably depending upon the particular starting reactants used to form the polyamide resin. Polyamide resins which are prepared from relatively short chain diacids and diamines having, for example, 5–10 carbon atoms will tend to be relatively crystalline and have excellent fiber forming properties. These types of polyamide resins are typically referred to as nylons.

Polyamide resins are also prepared from relatively long chain polyfunctional acids and diamines. A particularly important class of polyamide resins of this type are referred to as polymerized fatty acid polyamide resins. The polyfunctional acids used in the preparation of the polymerized fatty acid polyamide resins are derived from higher unsaturated fatty acids by polymerization. In the polymerization process, the fatty acids having double bond functionalities combine to produce a mixture of higher polymeric acids. The polymerized fatty acid polyamide resins are typically prepared by reacting one or more suitable diamines, most commonly relatively short chain diamines, with the polymerized fatty acid. Often another diacid is also reacted to increase the softening point or other properties. The polymerized fatty acid polyamide resins which are obtained tend to be more amorphous than the nylon type of polyamides resins and are generally more flexible. The differences in the physical properties of the polymerized fatty acid polyamide resins as compared to the nylon type of polyamide resins are considered to be related to the long chain length of the polymerized fatty acid component.

The polymerized fatty acid polyamide resins are widely used in a variety of industrial applications. Polymerized fatty acid polyamides are especially useful as hot melt adhesives and for forming water and solvent resistant coatings on substrates such as paper. An important related use of polymerized fatty acid polyamide resins is as binders in printing inks and the like where excellent film toughness, flexibility and adhesion are all important properties.

One of the problems encountered with the polyamide resins and particularly the polymeric fatty acid polyamides is concerned with the methods used to apply the polyamide resins to substrates. One method which has been suggested is to heat the polyamide resins above their melting point and then to apply the molten resin to the substrate. This has certain inherent problems in that polyamide resins typically have a high melting point, which is often higher than the thermal stability of the substrates on which it is desired to apply the molten polyamide resin. The hot melt method accordingly can only be used in certain limited applications and even these applications require relatively expensive application equipment. The use of molten polyamide resins is not practical in many common applications as, for example, in printing. Another example of where it is impractical to use molten polyamide resins is when the polyamide resin is intended to be applied as a latent hot melt layer to be activated at a later time. An example of this type of application is where the polyamide resin is desired to be applied to a textile interliner so that after the garment is completely assembled the hot melted adhesive can be activated to hold the assembled parts of the garment in position.

It was recognized in the art that certain of the problems associated with the polyamide resins could be solved if the polyamides could be applied at ambient temperatures from a solution or a dispersion. Suggestions were made to form organic solvent solutions of the polyamide resins. It was found, however, that for many applications this was unsatisfactory. Polyamide resins as a class have excellent resistance to solvents and even with respect to those solvents in which the polyamide resins are soluble the solubility typically is relatively low. Furthermore, the solvents which were used to make the polyamide resin solutions often adversely reacted with the substrates on which the polyamide resin solutions were applied. A further problem associated with solvent solutions was that the solvents which were used were relatively expensive, were often difficult or impossible to remove from the applied coatings and the solvent presented fire, toxicity and environmental pollution problems.

To overcome, or at least somewhat reduce the problems associated with solvent solutions of polyamide resins it was suggested to prepare emulsions or dispersions of the polyamide resins. The emulsions were prepared by initially dissolving the polyamide resin in an organic solvent and then by using selected emulsification agents form an emulsion of the solvent solution and water. The resulting solvent/water polyamide resin emulsions still had the problems associated with the presence of solvents as noted above for the solvent solutions and were relatively unstable. In addition, films formed from the emulsions tended to have an undesirable tackiness.

In British patent 1,491,136 there was disclosed a method for forming aqueous dispersions of various plastic powders, including polyamide resin powders. In the disclosed method, the polymer resin was first mechanically reduced to a powder form and then blended with water and a thickening agent. The method was less than satisfactory. The mechanical reduction of the resins to the required particle size was both expensive and difficult to control and often caused thermal degradation of the polymers. Furthermore, the resulting thickening dispersions had limited utility in many applications because of the relatively high viscosity and the presence of the thickening agent.

It was also suggested in the prior art to chemically modify the polyamide resins so as to include solublizing groups to make the modified resins more readily dispersible in water. This included, for example, incorporating groups such as alkoxymethyl as disclosed by Carirns in U.S. Pat. No. 2,430,860 and a related patent by Watsen et al in U.S. Pat. No. 2,714,075. The incorporation of the additional groups into the polyamide resin increased the cost of the polymer and also typically reduced the desirable properties of the polyamide resins especially in relation to water and solvent resistance.

Another method which was suggested for increasing the water dispersibility consists of forming the polyamide resin so that there is a considerable excess of either free carboxyl or free amine groups. At least a portion of the free acid or free amine groups were then neutralized to form salt groups on the polyamide resin. The resulting salt groups on the polyamide resin then acted as an internal surfactant which facilitates the dispersion of the modified polyamide in water. In Wittcoff et al U.S. Pat. No. 2,811,459 there is disclosed a method to form polymerized fatty acid polyamide dispersions wherein the polyamide is formed from a substantial excess of a diamine. The resulting polyamide resins are then dispersed in an aqueous solution of an acid so that the acid forms salt groups which act as the internal surfactant to allow formation of an aqueous dispersion. In Wittcoff et al U.S. Pat. No. 2,768,090 a process similar to that described above is disclosed wherein the excess amine groups of a polyamide resin are reacted with an acid to form an intrinsic ammonium salt group so as to be able to form a cationic dispersion which then is converted to an anionic dispersion by charge inversion. A similar salt forming process utilizing free amino groups was disclosed in Wittcoff U.S. Pat. No. 2,824,848. In Wittcoff U.S. Pat. No. 2,926,117 there is disclosed a method wherein the polyamide resin formed with a deliberate excess of acid groups is then dispersed in an aqueous medium containing an alkaline substance to thereby cause formation of salt groups to act as internal surfactants.

The above described methods for preparing aqueous dispersions of polymerized fatty acid polyamides where the polyamide is synthesized with substantial amounts of free amine or carboxylic acid groups, which are thereafter converted to their respective salt groups, is a relatively effective method for initially forming aqueous dispersions, but the dispersions have limited stability and are not satisfactory for use in many applications. These processes require the presence of substantial amounts of free acid or free amino groups for the salt formation. This has a definite adverse effect on the properties of the dispersed polyamide resin. The polymerized fatty acid polyamide resins are especially useful in products such as hot melt adhesives, water resistant coatings, printing inks and the like because of their physical properties including high strength, excellent flexibility, water and solvent resistancy, and the ability to form smooth non-tacky coatings. The optimum desired properties are achieved by conducting the amidations so as to cause as complete as a reaction as possible. This requires that approximately stoichiometric amounts of the starting diacid and diamine be employed and that the reaction be conducted so as to allow for complete reaction and formation of the amide groups so that the final product will have a low amine and low acid number. The presence of substantial excesses of either reactant or the incomplete reaction, as required for the prior art salt forming polyamide material, inherently reduces the chain length and the resulting strength and flexibility of the polyamide resin. It is also highly desirable in many applications where the polymeric fatty acid polyamide resins are employed, such as in hot melt applications or in coating applications, that the polyamide which is used be stable with regard to temperature and storage and have a narrow melting point range. These particular properties are best obtained with a completely reacted polyamide resin. The polymerized fatty acid polyamide resins with substantial amounts of free acid and amino groups such as those used in the prior art processes are unstable for these applications in that the modified polyamide resins continue to react during application which causes increases in the molecular weight, increases in the coating viscosities, and changes in the melting point. A still further problem encountered with the method wherein the salt forms of the polyamide resins are used is that the salts tend to decompose during application and the resulting material when applied becomes undesirably tacky. This is particularly undesirable in many applications such as in printing inks and protective coatings. Furthermore, because of the relative instability of the materials caused by substantial excess amounts of unreacted polymerized fatty acids in the polymer the fatty acids can be liberated from the polymer and cause exceptional tackiness and undesirable degradation of the desired properties of the polyamide resin. Because of the problems associated with the polymerized fatty acid polyamide resins having the salt groups formed as part of the polymer, the aqueous dispersions of these particular types of resins have had no substantial commercial success.

Accordingly, it would be highly advantageous if a method could be provided for forming stable aqueous dispersions of non-solvated, un-neutralized, low acid, low amine number polymerized fatty acid polyamide resins.

SUMMARY OF THE INVENTION

A method is provided for the preparation of stable aqueous dispersions of non-solvated, un-neutralized, low amine, low acid number polymerized fatty acid polyamide resins. In the preferred method of this invention, a polymerized fatty acid polyamide resin which has been prepared so as to have a low acid and low amine number is liquified by heating the polyamide resin to a temperature where it is at or above its melting point. The liquified polymerized fatty acid polyamide resin is then blended with a predetermined amount of water which is heated to a temperature such that the resulting blend will have a temperature above the melting point of the polyamide resin. A surfactant which may be anionic, nonionic or cationic, which will promote the emulsification of the polyamide resin in water is included in the mixture. The resulting mixture is then subjected to sufficient comminuting forces to form an emulsion in which droplets of the polyamide resin which have a volume average size distribution of about 20 microns or less in diameter and preferably 5 microns or less. Tee resulting emulsion is then cooled to a temperature below the melting point of the polyamide resin causing the emulsified droplets of the polyamide resin to solidify as finely divided particles which are dispersed uniformly through the aqueous phase. The resulting stable aqueous dispersions of the polymerized fatty acid polyamide resin which are obtained are especially useful when applied as coatings for hot melt adhesive applications, or utilized in coatings, inks, and the like.

DETAILED DESCRIPTION OF THE INVENTION

The polyamide resins which are used to form the aqueous dispersions of the present invention are polymerized fatty acid polyamide resins which have low acid and low amine numbers. The polymerized fatty acid polyamide resins which are suitable for use in this invention can be obtained commercially or can be prepared by generally well known methods.

The term "polymerized fatty acid" as used hereinafter in this specification is intended to be generic in nature and refers to polymerized acids obtained from fatty acids. The term "fatty acids" refers to saturated, ethylenically unsaturated and acetylenically unsaturated, naturally occurring and synthetic monobasic aliphatic carboxylic acids which contain from 8 to 24 carbon atoms.

For purposes of facilitating the explanation of this invention, specific references will be made to polymerized fatty acid polyamide resins which are obtained from C-18 fatty acids; but it should be appreciated that the method of this invention can likewise be employed with other polymerized fatty acid polyamides within the scope of this present invention.

The preferred starting acids for the preparation of the polymerized fatty acids used in this invention are oleic and linoleic acids because of their ready availability and relative ease of polymerization. Mixtures of these two acids are found in tall oil fatty acids making commerical tall oil fatty acids a convenient source of the starting materials. The fatty acids can be polymerized using various well known catalytic and noncatalytic polymerization methods. The typical composition of the polymerized fatty acids based on the C-18 tall oil fatty acids which are used as the starting materials for the polyamide resins used in the present invention is:

| $C_{18}$ | monobasic acids (monomer) | 0–15% by wt. |
|---|---|---|
| $C_{36}$ | dibasic acids (dimer) | 60–95% by wt. |
| $C_{54}$ (or higher) | trimer acid or polybasic acids | 0.2–35% by wt. |

In the preparation of the polymerized fatty acid polyamide resins used in the present invention, it is preferable that the starting polymerized fatty acid contain as high a percentage of the dimer acid, C-36 dibasic acid, as possible in order to obtain the optimum physical properties in the final product.

In addition to the polymerized fatty acids, a wide variety of dicarboxylic acids can be used in the preparation of the polymerized fatty acid polyamide resins used in the present invention, including aliphatic, cycloaliphatic and aromatic dicarboxylic acids. Representative of such acids, which may contain from 2 to 22 carbon atoms, are oxalic, glutaric, malonic, adipic, succinic, suberic, sebacic, azelaic, pimelic, terephthalic, isophthalic, phthalic, naphthalene dicarboxylic acids and 1,4- or 1,3-cyclohexane dicarboxylic acids. Methods of preparing these preferred acids are well known, and they are readily available commercially.

Preferred dicarboxylic acids employed in the invention are straight chain aliphatic diacids having at least 6 carbon atoms and more preferably 6 to 22 carbon atoms such as azelaic, sebacic, 1,18-octadecane dicarboxylic and 1,16-hexadecane dicarboxylic acids, the latter two being most preferred. It should be understood that use of the corresponding acid anhydrides, esters, and acid chlorides of these acids is included in the term "dicarboxylic acid".

The diamines used in the preparation of the polymerized fatty acid polyamide resins used in the present invention may be one or more of the known aliphatic, cycloaliphatic or aromatic diamines having from about 2 to 20 carbon atoms. Preferred especially are the alkylene diamines. Illustrative of the preferred diamines are ethylene diamine, 1,3-diaminopropane, 1,4-diaminobutane, terephthalyl diamine, known as p-xylene diamine, 1,6-hexamethylene diamine, 4,4'-methylenebis(cyclohexylamine), 2,2-bis-(4-cyclohexylamine) propane, polyglycol diamines, isophorone diamine, isophthalyl diamine, known as m-xylene diamine, cyclohexanebis(methylamines), 1,4-bis-(2'-aminoethyl)benzene, 4,4'-methylenebis(cyclohexylamine) and piperazine. These diamine compounds are all prepared by well known methods and many are commercially available. Preferred particularly are the straight chain aliphatic diamines of 2 to 20 carbons atoms, especially ethylene diamine and hexamethylene diamine, and cycloaliphatic diamines, especially 4,4'-methylenebis(cyclohexylamine).

In the method of the present invention, it is desirable to use as the polymerized fatty acid polyamide a material which is the result of as complete an amidation reaction as possible between the starting polymerized fatty acid and the diamine. The degree of completion or the amidation process can be determined by evaluating the acid number and the amine number of the final polymer. The term acid number refers to the number of milligrams of potassium hydroxide required to neutralize the free acid in one gram of the polymer. The term amine number refers to the number of milligrams of potassium hydroxide equivalent to the free or excess amine groups present in the final polymer. For purposes of this invention, it would be especially ideal if the amine and the acid numbers of the polyamine resin were each 0. However, it is often difficult, if not impossible, to reach a perfect balance of the amine and carboxylic acid groups in the polyamide. It was found, however, that the polymerized fatty acid polyamide resins having relatively low amine numbers of, for example, up to about 10 and acid numbers up to about 12, are especially useful in the present invention. It is of interest to note that in this regard, using the salt forming methods to form internal surfactants as disclosed in the prior art the polyamide resins having low acid and low amine numbers of the type used in the present invention were not readily dispersible and the resulting dispersions were quite unstable.

The number of free acid groups and free amine groups present in the polymerized fatty acid polyamide resin are directly related to the relative amount of the polymeric fatty acids, dicarboxylic acids and the diamines involved in the polymerization reaction and the degree of completion of the reaction. For the above reasons, approximately stoichiometic amounts of the polymerized fatty acids plus the dicarboxylic acids and the diamines based on the total number of available acid and amine groups should be used to prepare the polyamide resins for this invention and the reaction conditions should be selected to ensure completion or substantial completion of the amidation reaction. The reaction conditions required for the amidation reaction are generally well known in the art with the reaction being generally conducted at temperatures from about 100° C. to 300° C. for 1-8 hours.

In the dispersion process of the present invention, the polymerized fatty acid polyamide resin is initially liquified by heating the polyamide resin to at least its melting point and more preferably to a temperature of at least 5° above its melting point but below the decomposition temperature of the polyamide resin. The liquification process is preferably conducted in a closed vessel under a protective blanket of inert gas such as nitrogen. The melting temperature of the polymerized fatty acid polyamide resin will vary considerably depending upon the particular starting reactants employed to prepare the polyamide resin. Typically, however, these polyamide resins will melt in the temperature range from somewhat below the boiling point of water to somewhat above the boiling point of water. If the temperature to which the molten polyamide resin will be heated for liquification is above the boiling point of water, the process equipment used in the method of the present invention must be capable of being operated at elevated pressures and temperatures.

In a separate vessel, water is heated to a temperature which is preferably at least as high as the melting point of the polymerized fatty acid polyamide resin which is to be dispersed and more preferably at least about 5° higher than the melting point of the polyamide resin. Under these conditions the water may be required to be heated and maintained under pressure in order to have sufficient temperature to be higher than the melting point of the polyamide resin.

In an alternative method the water can be heated to a temperature somewhat below the temperature of the polymerized fatty acid polyamide resin and the polyamide resin heated to a temperature significantly above its melting point so that the resulting blend of water and polyamide resin will have a temperature above the melting point of the polyamide resin.

A surfactant, or combination of surfactants, is added to either the molten polymerized fatty acid polyamide resin, or to the water or to both the polyamide resin and the water in a predetermined amount. The surfactant or combination of surfactants which are used in the process of this invention are ones which will promote the emulsification of the molten polyamide resin and the water as will be explained below in greater detail and which will also act to stabilize the final dispersion of the polyamide resin in the water. In part because of the relative neutral charge of the polymerized fatty acid polyamide resins used in the preparation of the dispersions of this invention, a wide variety of different types of surfactants can be successfully employed. The surfactants which are selected are those which are capable as acting as oil in water emulsifying agents for the polyamide resin-water mixture. The surfactants include well known anionic, polar and non-polar nonionics, and cationic surfactants.

The cationic surfactants which have been found to be especially useful are the alkyl ammonium salts such as 1-hexadecyltrimethyl ammonium bromide or chloride; alkyl pyridinium salts such as 1-hexadecylpyridinium bromide and cetylpyridinium chloride; and alkyl imidazolinium salts such as 1-hexadecylimidazolinium bromide. Cationic surfactants which are the salts of organic primary amines are not included within the scope of this invention.

Among the anionic surfactants which have been found to be especially useful are the sodium and potassium salts of fatty acids, the sodium and potassium salts of dimer acid or polymerized fatty acids, phosphate esters of fatty acids, and the sodium and potassium salts of rosin.

Among the nonionic surfactants which have been found to be especially useful are nonylphenol polyethoxyethanol (commercially available under the name Tergitol NP-40 from Union Carbide Corporation, Danbury, Conn.) and polyethoxylated castor oil (commercially available under the name GAF Emulphors).

While not all surfactants are suitable for use in the method of the present invention, it has been found that a wide range of surfactants are suitable. It is relatively simple to screen suitable surfactants for use in the presence of this invention. It was found, for example, that the preferred surfactants are those which exhibit outstanding ability to cause the emulsification of the liquified polymerized resin in the water. These surfactants are typically also highly effective in imparting a long term stability to the final dispersion.

The surfactants utilized in the present invention as indicated above are added either to the molten polyamide resin or to the water to be used in the emulsification process. The surfactant, however, is preferably added to the water because of the relative ease of addition. The relative amount of the employed surfactant added is based on the amount of the polymerized fatty acid polyamide resin which is to be present in the final dispersion and on the particular surfactant used. It has been found, however, that optimum results are obtained when the surfactant is used in an amount from about 0.2 to about 10 and preferably 0.2 to about 2 percent by weight based on the weight of the polymerized fatty acid polyamide resin.

In carrying out the process of the present invention the liquified polymerized fatty acid polyamide resin, the heated water and the surfactant are blended together in a predetermined ratio while maintaining the temperature of the individual components and the mixture which is obtained above the melting point of the polymerized fatty acid polyamide resin. In this regard, it is important that the equipment utilized in the initial blending step likewise be heated to appropriate temperatures to prevent the premature deposition of liquified polyamides on the equipment and a cooling of the blend of materials. The molten polymerized fatty acid polyamide resin, the water and the surfactant are blended in ratios such that the resulting mixture of materials will contain from about 20 to 60, and preferably about 50 percent by weight of the polymerized fatty acid polyamide resin.

The mixture is subjected to comminuting forces sufficient to form a finely divided emulsion in which the droplets of the molten polmerized fatty acid polyamide resin have a volume average size distribution of 20 microns or less in diameter and more preferably 5 microns or less in diameter. Particle size distribution can be determined by a number of methods, such as sedimentation or laser light scattering techniques. The particular type of apparatus used for applying the comminuting force to the blend of the polyamide resin, water, and surfactant to some extent is a matter of choice and can include apparatus which operates on the basis of shear, impact, or a combination of these process steps. The equipment includes commercially available apparatus such as homogenizers, submicron dispersers, emulsifiers, colloid mills, ultrasonic sound mixers and the like. In general it is preferable for process purposes to run the blend through the comminuting equipment for one pass in that this facilitates the manufacturing process. It should be appreciated however that the blend may be sent through the comminuting equipment for a number of passes in order to obtain the smaller size droplets. In general, the smaller the size of the liquid droplets the more stable will be the resulting dispersions made from the emulsion.

The final step in the process of this invention concerns cooling down the emulsion to a temperature below the melting point of the polymerized fatty acid polyamide resin so as to cause the finely divided droplets in the emulsion to solidify into finely divided dispersed particles. The cooling is preferably conducted in a relatively rapid fashion so as to prevent coagulation of the particles during that portion of the solidification wherein the droplets become semi-solid and highly adhesive. Cooling of the emulsions prepared at super atmospheric pressures can be rapidly performed by pumping the emulsion through a heat exhange or the like. Alternatively, or in addition to using a heat exchanger, the cooling can be caused by evaporation of water from a rapid reduction in the pressure.

The resulting dispersions which are obtained according to this invention are characterized by having exceptional stability. In the methods used in the prior art, when low amine, low acid number, polymerized fatty acid polyamide resins of the type used in this invention were dispersed using the salt forming technique, the resulting dispersions would rapidly separate into a cream-like layer containing a high concentration of the particles of the resin and an essentially pure water layer in a matter of a few hours. The polymerized fatty acid polyamide resin dispersions prepared in accordance with the present invention do not separate even when allowed to stand at ambient temperatures for twenty-four hours or more. Accordingly, for purposes of this specification the term "stable" refers to the stability of dispersion which when cooled to ambient temperatures, that is, room temperature, will not separate within twenty-four hours. It has been found however that the dispersions prepared in accordance with this invention typically will be stable over extremely long periods of time with stabilities in excess of six months not being uncommon. Furthermore, the dispersions of this invention do not require that the starting polymerized fatty acid polyamide resin be initially solvated in a strong solvent or that the polyamide resin be formed with excess amine and acid groups to allow for salt formation as is required in the prior art methods of forming dispersions. A further advantage of the polyamide resin dispersions of this invention is that the dispersions, once formed, can be freeze-dried resulting in a finely divided powder which can be redispersed with minimal agitation to reform a stable dispersion. The excellent stability of the dispersions of this invention are further shown by the ability of the dispersions to undergo repeated freeze-thaw cycles without causing a breakdown on the dispersion. More importantly, however, the resulting properties of the coatings, inks, hot melt adhesives, and the like made from the dispersions of the present invention are superior in over all properties to that obtained with the dispersions made according to the prior art techniques.

The polymerized fatty acid polyamide aqueous dispersions of this invention can contain in addition to the above-noted materials, various additives. One particularly useful type of additive is stabilizing agents to prevent flocculation of the polyamide resin particles. Typical stabilizers include water soluble alkali metal salts of polymeric organic acids. The stabilizers can also include protective colloids such as lignin derivatives, proteins, water soluble cellulose derivatives, starch, alginic acid, and long chain alcohols and lecithin. The amount of stabilizing agent employed can vary in amounts from 0.5% to about 10% based on the weight of the polyamide resin. The polyamide dispersion may likewise contain other materials such as viscosity modifiers, plasticizers, dyes, pigments and the like. In this regard, it should be noted that the excellent stability of the polymerized fatty acid polyamide resin dispersions of this invention allow substantial loadings of additives without adversely affecting the overall stability of the polyamide dispersion.

The following examples are given by way of further illustration of the present invention and are not intended to limit the scope of this invention beyond that of the subjoined claims.

EXAMPLE 1

An aqueous dispersion of a polymerized fatty acid polyamide resin having a ring and ball softening point of 100 degrees C. and an amine number of 3 and an acid number of 2 (commercially available as Uni-Rez 2940 from Union Camp Corporation, Wayne, N.J.) was prepared as follows.

42.80 parts by weight of the polyamide resin was mixed together with 56.50 parts by weight of water, 0.64 parts by weight of an anionic surfactant, the potassium salt of oleic acid (commercially available as Century 1005, Union Camp) and 0.06 parts by weight of the potassium salt of a polyacrylic acid (a stabilizer available as Carbopol 934 from BF Goodrich Company, Cleveland, Ohio) and then heated to 130 degrees F. and subjected to sufficient high shear forces to form an emulsion. The resulting emulsion was cooled to room temperature to form a dispersion which was stable in excess of 7 days.

EXAMPLE 2

The process of Example 1 was repeated.

42.6 parts by weight of the polyamide resin was mixed together with 56.8 parts by weight of water and 0.6 parts by weight of a nonionic surfactant, a polyethoxylated nonyl phenol (commercially sold as Tergitol NP-40 available from Union Carbide Corporation, Danbury, Conn.) and then heated to 115 degrees C. The resulting dispersion was stable in excess of 24 hours.

EXAMPLE 3

The process of Example 1 was repeated using a polymerized fatty acid polyamide resin having a ring and ball softening point of 118 degrees C., and an acid number of 1 and an amine number of 7 (commercially available as Uni-Rez 2646 from Union Camp Corporation, Wayne, N.J.).

44 parts by weight of the polyamide resin were mixed together with 54.7 parts by weight of water and 1.3 parts by weight of a cationic surfactant, 1-hexadecylpyridinium chloride (commercially available from Hexcel Corp., Zeeland, Mich.) and heated to 200 degrees C. The resulting dispersion was stable in excess of 4 months.

EXAMPLE 4

The procedure of Example 1 was repeated with the exception that the polyamide resin and the aqueous solution containing the anionic surfactant and stabilizer were heated in separate tanks. The liquified resin and the aqueous solution were metered into a mixing tee and then into a high shear colloid mill under pressure at a temperature of about 120 degrees C. The emulsion was then released into a heat exchanger where it was cooled to below 100 degrees C. and then allowed to cool to ambient temperature while standing. The resulting product was essentially the same as that obtained in accordance with the procedure of Example 1 with the exception that the particle size distribution in the final dispersions were somewhat smaller.

EXAMPLE 5 (COMPARATIVE EXAMPLE)

The process of Example 1 was repeated with the exception that an amount of sodium hydroxide equivalent to the acid number was used in place of the surfactant. It was noted that in the emulsification process resulting emulsions were quite poor. Following through with the emulsions, it was found that the resulting dispersions of the polyamide product were quite unstable as formed and rapidly separated in less than four hours at ambient temperatures.

What is claimed is:

1. In a method for the preparation of an aqueous dispersion of a polyamide resin which comprises heating said resin to at least its melting point to liquify said resin, adding said liquified resin to water and an effective amount of a surfactant effective in forming emulsions of said liquified resin in water to form a mixture, subjecting the mixture to comminuting forces, and cooling said mixture below the melting temperature of said resin; the improvement of providing aqueous polyamide resin dispersions stable against separation into separate phases at ambient temperatures in excess of 24 hours wherein: (1) said polyamide resin is an amorphous, non-solvated, un-neutralized, polymerized fatty acid polyamide resin, the polymerized fatty acid portion thereof obtained by polymerization of a saturated, ethylenically unsaturated or acetylenically unsaturated monobasic carboxylic acid containing 8 to 24 carbon atoms and the resin having an acid number of up to about 12 and an amine number of up to about 10, (2) the water is heated to a temperature such that the mixture will have a temperature above the melting point of said polyamide resin, the percentage of said resin in said mixture with water being between about 20 and about 60 percent, (3) said surfactant is other than the salt of an organic primary amine, and (4) the step of subjecting the mixture to comminuting forces forms an emulsion of droplets of said liquified resin in water having an average volume size distribution of less than 20 microns.

2. The method according to claim 1 wherein the polyamide resin is heated to a temperature which is at least 5 degrees above the melting temperature of the polyamide resin.

3. The method according to claim 1 wherein the water is heated to a predetermined temperature which is at least the melting temperature of the polyamide resin.

4. The method according to claim 1 wherein the water is heated to a predetermined temperature which is at least about 5 degrees above the melting temperature of the polyamide resin.

5. The method according to claim 1 wherein the surfactant is an anionic surfactant selected from the group consisting of sodium salts of fatty acid, potassium salts of fatty acids, sodium salts of dimer acid, potassium salts of dimer acids, phosphate esters of fatty acids, sodium salts of rosin, and potassium salts of rosin.

6. The method according to claim 1 wherein the surfactant is present in an amount from about 0.2 to about 10 percent by weight based on the weight of the polyamide resin.

7. The method according to claim 1 wherein the emulsion is formed with droplets having a volume average particle size distribution of less than 5 microns.

8. The method according to claim 1 wherein the comminuting to form the emulsion is conducted at super atmospheric pressures and cooling is conducted by passing the emulsion through a heat exchanger.

9. The method according to claim 1 wherein the fatty acids are oleic and linoleic acids.

10. The method according to claim 1 wherein about 60 to 95 weight percent of the polymerized fatty acids are dibasic acids and about 0.2 to 35 weight percent are trimer or polybasic acids.

11. The method according to claim 1 wherein the diamines used in the preparation of the polymerized fatty acid polyamide resins are selected from aliphatic, cycloaliphatic and aromatic diamines having from about 2 to 20 carbon atoms.

12. The method according to claim 1 wherein the diamines are selected from ethylene diamine, hexamethylene diamine and 4, 4'-methylenebis(cyclohexylamine).

13. The method according to claim 1 wherein a stabilizing agent to prevent flocculation of the polyamide resin particles is added in an amount from 0.5 to 10% based on the weight of said resin.

14. In a method for the preparation of an aqueous dispersion of a polyamide resin which comprises adding said resin in solidified form to water and an effective amount of a surfactant effective in forming emulsions of said resin in water when said resin is in liquified form to form a mixture, heating the mixture to a temperature which is at least as high as the melting point of said resin, subjecting the mixture to comminuting forces, and cooling said mixture below the melting temperature of said resin; the improvement of providing aqueous polyamide resin dispersions stable against separation into separate phases at ambient temperatures in excess of 24 hours wherein: (1) said polyamide resin is an amorphous, non-solvated, un-neutralized, polymerized fatty acid polyamide resin, the polymerized fatty acid portion thereof obtained by polymerization of a saturated, ethylenically unsaturated or acetylenically unsaturated monobasic carboxylic acid containing 8 to 24 carbon atoms and the resin having an acid number of up to about 12 and an amine number of up to about 10, (2) the percentage of said resin in said mixture with water between about 20 and about 60 percent, (3) said surfactant is other than the salt of an organic primary amine, and (4) the step of subjecting the mixture to comminuting forces forms an emulsion of droplets of said liquified resin in water having an average volume size distribution of less than 20 microns.

* * * * *